US010810195B2

(12) United States Patent
Kandukuri et al.

(10) Patent No.: US 10,810,195 B2
(45) Date of Patent: Oct. 20, 2020

(54) DISTRIBUTED RELATIONAL DICTIONARIES

(71) Applicant: Oracle International Corporation, Redwood Shores, CA (US)

(72) Inventors: Anantha Kiran Kandukuri, Zurich (CH); Seema Sundara, Nashua, NH (US); Sam Idicula, Santa Clara, CA (US); Pit Fender, Union City, CA (US); Nitin Kunal, Zurich (CH); Sabina Petride, Tracy, CA (US); Georgios Giannikis, Zurchi (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 240 days.

(21) Appl. No.: 15/861,212

(22) Filed: Jan. 3, 2018

(65) Prior Publication Data

US 2019/0205446 A1 Jul. 4, 2019

(51) Int. Cl.
*G06F 17/00* (2019.01)
*G06F 16/2453* (2019.01)
(Continued)

(52) U.S. Cl.
CPC ...... *G06F 16/2453* (2019.01); *G06F 16/1744* (2019.01); *G06F 16/221* (2019.01); *G06F 40/242* (2020.01); *H04L 67/1097* (2013.01); *G06F 16/2282* (2019.01); *G06F 16/2365* (2019.01)

(58) Field of Classification Search
CPC ............ G06F 17/2735; G06F 17/2785; G06F 16/2282; G06F 16/36; G06F 16/221; G06F 16/3344
See application file for complete search history.

(56) References Cited

U.S. PATENT DOCUMENTS

2019/0155925 A1   5/2019 Giannikis et al.
2019/0155930 A1*  5/2019 Fender ................ G06F 16/2282

OTHER PUBLICATIONS

Westmann et al., "The Implementation and Performance of Compressed Databases", SIGMOD Rec., 29(3): pp. 55-67, 2000.

(Continued)

*Primary Examiner* — Truong V Vo
(74) *Attorney, Agent, or Firm* — Hickman Palermo Becker Bingham LLP (57) ABSTRACT

Techniques related to distributed relational dictionaries are disclosed. In some embodiments, one or more non-transitory storage media store a sequence of instructions which, when executed by one or more computing devices, cause performance of a method. The method involves generating, by a query optimizer at a distributed database system (DDS), a query execution plan (QEP) for generating a code dictionary and a column of encoded database data. The QEP specifies a sequence of operations for generating the code dictionary. The code dictionary is a database table. The method further involves receiving, at the DDS, a column of unencoded database data from a data source that is external to the DDS. The DDS generates the code dictionary according to the QEP. Furthermore, based on joining the column of unencoded database data with the code dictionary, the DDS generates the column of encoded database data according to the QEP.

20 Claims, 7 Drawing Sheets (51) Int. Cl.
*H04L 29/08* (2006.01)
*G06F 16/22* (2019.01)
*G06F 16/174* (2019.01)
*G06F 40/242* (2020.01)
*G06F 16/23* (2019.01)

(56) References Cited

OTHER PUBLICATIONS

Ristov, Strahil, LZ Trie and Dictionary Compression, Software: Practice and Experience, vol. 35, Issue 5, pp. 445-465, Apr. 25, 2005.
Ray et al., "Database Compression: A Performance Enhancement Tool", Proc. of 7th Intl. Conf. on Management of Data, COMAD, 1995, 20 pages.
Poess et al., "Data Compression in Oracle", VLDB 2003: Proceedings of the 29th International Conference on Very Large Data Bases, pp. 937-947.
Binnig et al., "Dictionary-based order-preserving string compression for main memory column stores", ACM SIGMOD 2009, 13 pages. Antoshenkov et al., "Order Preserving Compression", ICDE 1996: Proceedings of the Twelfth International Conference on Data Engineering, pp. 655-663.
Abadi et al., "Integrating Compression and Execution in Column-Oriented Database Systems", SIGMOD 2006, pp. 671-682.
Fender, U.S. Appl. No. 15/819,193, filed Nov. 21, 2017, Office Action, dated Dec. 27, 2019.

* cited by examiner

DISTRIBUTED RELATIONAL DICTIONARIES

TECHNICAL FIELD

Embodiments are generally related to information storage and retrieval technology. More specifically, embodiments are related to distributed relational dictionaries.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a database management system (DBMS) by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node comprises one or more hardware processors. Each hardware processor may comprise multiple core processors on the same chip, each core processor (hereinafter "core") being capable of separately executing a machine code instruction within the same clock cycles as another core. Thus, each node may efficiently perform computations in parallel across multiple cores.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Dictionary Compression

Typically, a column of database data is stored in a compressed format to conserve space in memory. Often used is a lightweight compression technique known as "dictionary encoding", which enables data that comprises a relatively large number of bits to be represented by a relatively small number of bits. The relatively large number of bits corresponds to a value of database data and is hereinafter referred to as a "token". The relatively small number of bits corresponds to an encoded representation of the token and is hereinafter referred to as a "code". An example of a token is a string, and an example of a code is one memory word integer. Tokens and codes exhibit a one-to-one relationship with each other.

Figure 1:
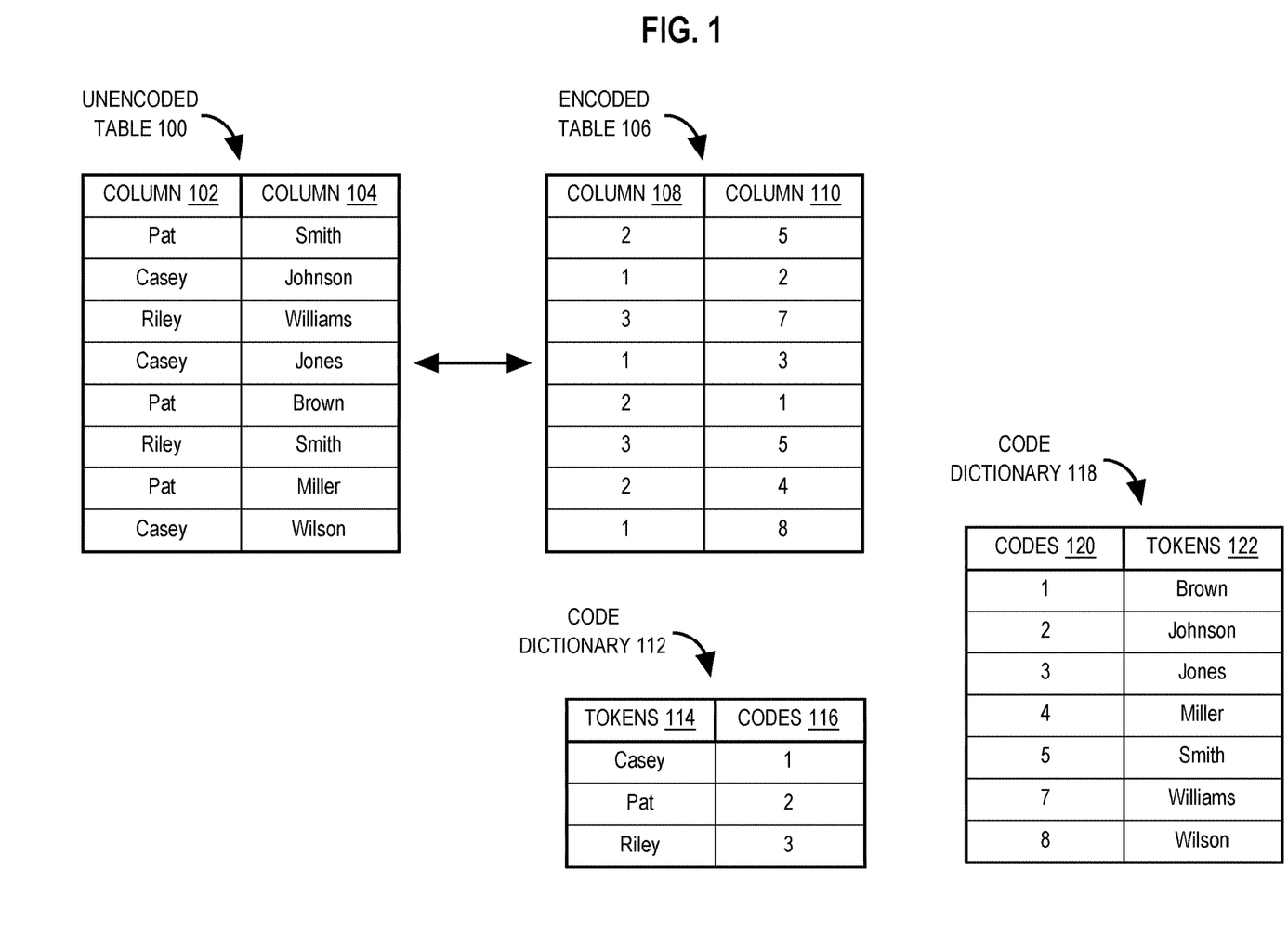
FIG. 1 depicts example relational dictionaries.

In the example of FIG. 1, columns 102-104 comprise database values in an uncompressed format, and columns 108-110 comprise the database values in a compressed format. Tokens 114 comprise the uncompressed values of column 102, and codes 116 comprise the encoded representations of tokens 114. Similarly, tokens 122 comprise the uncompressed values of column 104, and codes 120 comprise the encoded representations of tokens 122.

Advantageously, columns 108-110 store codes 116 and 120 instead of tokens 114 and 122, thereby achieving a significant savings in memory utilization. As such, columns 108-110 can fit in relatively fast but small memory, such as dynamic random-access memory (DRAM), where queries can be executed against it relatively quickly.

Although FIG. 1 depicts tokens 114, 122 and codes 116, 120 as values of particular data types, it should be appreciated that the particular data types used may vary from implementation to implementation. However, to realize space savings, codes 116, 120 preferably comprise fewer bits than tokens 114, 122.

Among the costs of achieving the aforementioned space savings is the overhead of generating and storing mappings that enable translation between tokens and codes and vice versa. A token-to-code mapping enables compression of database data, such as when a database table is loaded into a database system; and a code-to-token mapping enables decompression of database data, such as when a query is evaluated over the database table. A token-to-code mapping is hereinafter referred to as an "encoding dictionary", and a code-to-token mapping is hereinafter referred to as a "decoding dictionary".

An encoding dictionary and a decoding dictionary may be implemented as separate structures. For example, an encoding dictionary may be implemented as a trie or a hash table, whereas a decoding dictionary may be implemented as an array of distinct tokens. This is because some structures are more suitable for encoding, whereas other structures are more suitable for decoding. However, the overhead of generating and storing multiple structures is significantly higher than the overhead of generating and storing a single structure.

Local Versus Global Dictionaries

Hereinafter, an encoding dictionary and a decoding dictionary are collectively referred to as a "code dictionary". Depending on how much of a particular column of database values is associated with a code dictionary, the code dictionary may be a "local dictionary" or a "global dictionary". As used herein, a dictionary is said to be "for" or "associated with" database data if the dictionary is to be used for compressing and/or decompressing the database data.

A "local dictionary" may be associated with less than all values of a column of a database table. For example, a column of a database table may be divided into chunks of 16 KB each, and each chunk may have its own local dictionary. As another example, a database table may be partitioned into shards of 16 GB each, and to spread load, each shard may be stored on a separate node of a "shared nothing" cluster; thus, each node may have its own local dictionary, which is associated with a column of a particular shard.

Local dictionaries are typically generated and stored in relatively small sizes. Thus, they can be generated with relatively low computational complexity and overhead. Furthermore, they can be stored in relatively fast but small memory along with the compressed data with which they are associated.

However, maintaining local dictionaries can result in increased computational overhead when executing queries. This is because different local dictionaries may have different codes for the same token. For example, in Local Dictionary A, the token "Alexis" may map to the code "1", but in Local Dictionary B, the token "Alexis" may map to the code "2". Thus, it may be necessary to implement complex logic for reconciling different codes.

In contrast, a "global dictionary" is associated with an entire column of a database table. For example, a column of a database table may be divided into chunks of 16 KB each, but all the chunks may share the same global dictionary. As another example, a database table may be partitioned into shards of 16 GB each, and to spread load, each shard may be stored on a separate node of a "shared-nothing" cluster; however, for a particular column, all the nodes may share the same global dictionary. In other words, mappings between tokens and codes do not vary from chunk to chunk, from node to node, or from shard to shard; rather, the mappings are consistent across the system.

Since a global dictionary is consistent across a database system, query execution does not involve increased computational overhead for reconciling different codes. However, generating a global dictionary can involve a complex process that is both compute intensive and memory intensive. Furthermore, to enable access by all database instances, a global dictionary is typically stored in shared memory. In some cases, however, the relatively large global dictionary may not fit in shared memory or may inefficiently occupy precious space that could have been used to store other system-level data.

These are some of the drawbacks experienced when a global dictionary is generated by and stored on a centralized database system, such as a single node database system or a "shared everything" multi-node database system. Indeed, relatively high latency is typically exhibited when global dictionary generation, encoding, and decoding are performed at a centralized location. However, there are few, if any, viable alternatives. In particular, there are few, if any, existing mechanisms for generating a global dictionary using anything other than a centralized database system. This is because of the difficulty of synchronization between/among multiple locations that are concurrently generating a global dictionary.

Furthermore, storing a global dictionary on a centralized database system may cause network resources to be significantly taxed during query execution. Since the global dictionary is stored in shared memory on the centralized database system, only encoded values are typically sent to the nodes of the centralized database system and/or the nodes of a distributed database system that is communicatively coupled to the centralized database system. Thus, decoding the encoded values may involve a significant amount of communications between the nodes and the storage location of the global dictionary.

To alleviate some of the aforementioned drawbacks, a global dictionary may be generated by a centralized database system but stored on a distributed database system, such as a "shared nothing" cluster of nodes. This enables dictionary encoding and decoding to be performed with relatively low latency and efficient utilization of network resources. However, generating the global dictionary would continue to be a bottleneck for all subsequent processes.

Another alternative is for a distributed database system to generate and store local dictionaries instead of a global dictionary. However, this does little more than trade the aforementioned drawbacks for the increased computational complexity of executing queries using local dictionaries.

Dictionary Generation

Dictionary generation typically involves a hard-coded process such that there is only one way of generating a code dictionary. However, such a hard-coded process can result in inefficiencies, because it fails to consider different characteristics of different columns. In other words, a hard-coded process takes a "one-size-fits-all" approach that often wastes computing resources and scales poorly.

For example, a hard-coded dictionary generation process may involve (1) sorting a set of tokens and then (2) removing duplicate tokens. Although the process may efficiently generate a code dictionary for a column having a large number of distinct tokens, the process would inefficiently generate a code dictionary for a column having a small number of distinct tokens. This is because a large number of duplicate tokens would be unnecessarily sorted.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" are used to differentiate elements and do not necessarily indicate any particular order.

Introduction

The compute, memory, and network power of a distributed database system is leveraged for efficient global dictionary generation, encoding, and decoding. This is achieved based on modifications to the query optimizer of the distributed database system, thereby leveraging the existing capabilities of the query optimization framework for determining the most efficient plan for executing a database command in a distributed environment.

The modifications enable the query optimizer to generate a query execution plan for generating a global dictionary for a column of database data and encoding the column of database data using the global dictionary. In particular, the query execution plan specifies a sequence of operations for generating the global dictionary. The specified sequence is selected to be the optimal sequence from a plurality of candidate sequences based on the column's characteristics, such as the number of distinct values.

In some embodiments, the global dictionary is a "relational dictionary" that can be used as both an encoding dictionary and a decoding dictionary. A relational dictionary is a database table that stores a set of relationships between a set of tokens and a set of codes. A database dictionary may define a relational dictionary and each of its columns. Significantly, implementation of a relational dictionary as a database table enables it to be referenced in queries and DDL statements, thereby enabling use of the query optimizer to determine the most efficient plan for executing database commands involving the relational dictionary.

Relational Dictionaries

As mentioned above, a global dictionary may be a relational dictionary. Referring to FIG. 1, code dictionaries 112 and 118 are example relational dictionaries. Each code dictionary 112, 118 is implemented as a database table having two columns—one for tokens 114, 122 and one for codes 116, 120.

Each entry of a code dictionary 112, 118 stores a unique relationship between a token and a code. Logically, each relationship can be represented as a tuple comprising a code element and a token element. Thus, a relational dictionary can be logically represented as a set of tuples, each tuple having the format "<token, code>" or "<code, token>".

Significantly, each entry of a code dictionary 112, 118 can be used for both encoding and decoding. Advantageously, the overhead of storing and maintaining a relational dictionary is less than the overhead of storing and maintaining separate encoding and decoding dictionaries.

Unencoded table 100 comprises columns 102-104, which are columns of unencoded database data. As used herein, the term "unencoded" also encompasses the term "decoded".

In contrast, encoded table 106 comprises columns 108-110, which are columns of encoded database data. Encoded database data is generated based on joining unencoded database data with one or more relational dictionaries. For example, to generate encoded table 106, unencoded table 100 may be joined with code dictionaries 112 and 118.

Similarly, decoded database data is generated based on performing a join operation involving a relational dictionary. More specifically, encoded database data is joined with a relational dictionary. For example, to generate unencoded table 100, encoded table 106 may be joined with code dictionaries 112 and 118.

In some embodiments, a relational dictionary is a "token-ordered dictionary". A token-ordered dictionary maintains tokens in a token order with the order of the codes mirroring the order of the respective tokens. For example, code dictionary 112 is a token-ordered dictionary. Tokens 114 are organized in a lexicographical order, and codes 116 are organized in an increasing order that mirrors the lexicographical order.

Advantageously, token-ordered dictionaries can be used to efficiently evaluate "range queries" over encoded database data. As used herein, a range query specifies an upper boundary and/or a lower boundary for a set of one or more values. An example range query is "SELECT * FROM table WHERE token column>'Pat'. According to code dictionary 112, the query predicate is satisfied by any code that is greater than "2". Thus, the example range query can be efficiently evaluated based on scanning column 108 for any codes that are greater than "2".

Process Overview

As mentioned above, a query optimizer of a distributed database system may be modified to generate a query execution plan for dictionary generation and encoding. In some embodiments, the modified query optimizer generates the query execution plan when unencoded database data is loaded into the distributed database system. Thus, the query optimizer may be modified to be invoked by a database command for loading unencoded database data.

Figure 2:
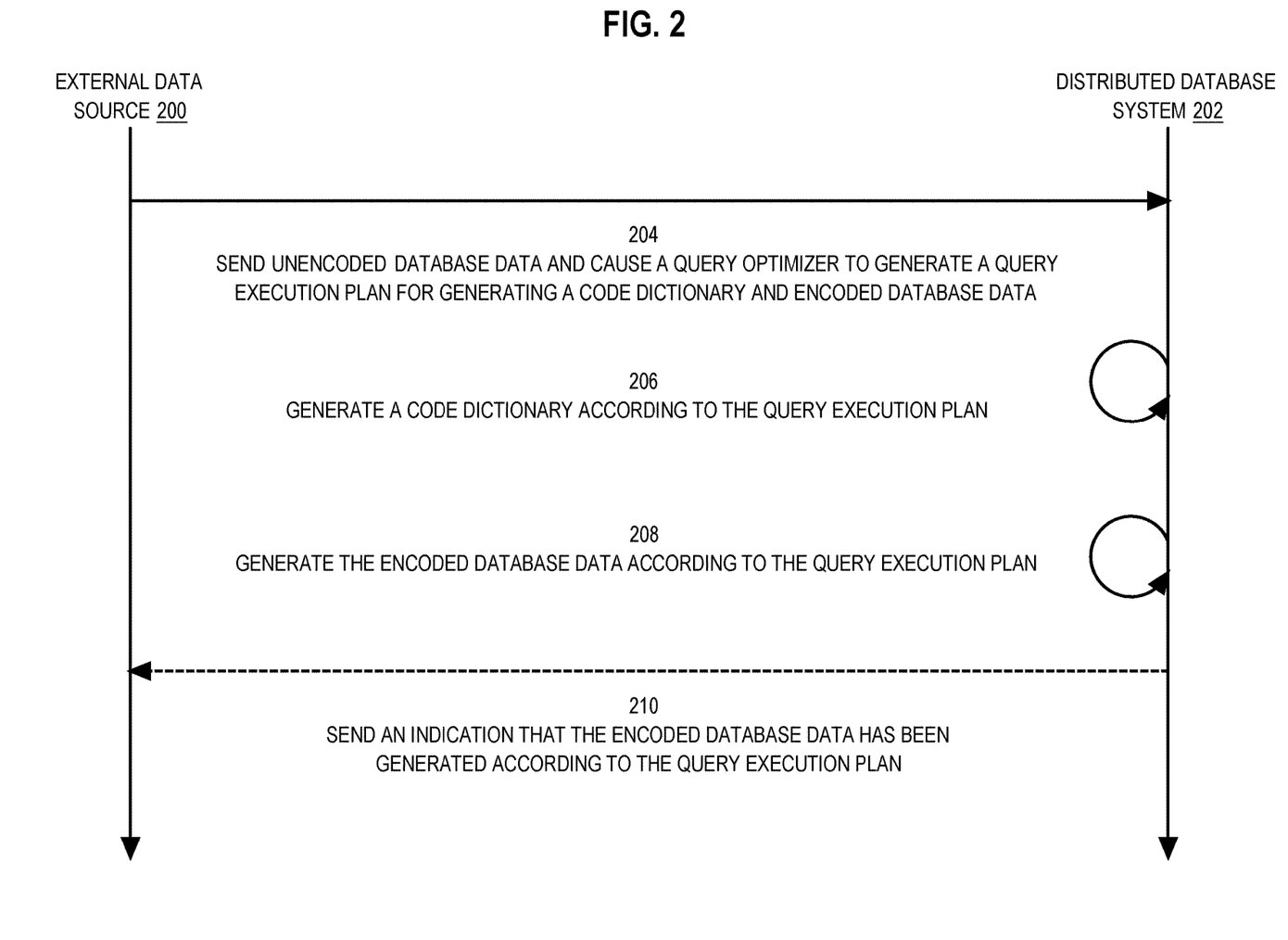
FIG. 2 is a message sequence diagram that depicts an example approach for dictionary generation and encoding in a distributed environment.

Some embodiments involve external data source 200 and distributed database system 202 as depicted in FIG. 2. Thus, the query optimizer of distributed database system 202 may be modified such that the query optimizer is aware of external data source 200. External data source 200 may be a centralized database system, a computer system storing a flat file, or any other source of data that is external to distributed database system 202. Based on a "BEGIN_LOAD" database command, external data source 200 may initiate a protocol for loading unencoded database data from external data source 200 into distributed database system 202.

Prior to/concurrently with loading unencoded database data into distributed database system 202, external data source 200 and/or distributed database system 202 may make a cost-based determination as to which columns of unencoded database data to encode at external data source 200 and which columns of unencoded database data to encode at distributed database system 202. One or more query optimizers may make this determination based on any of a variety of factors including column characteristics, available memory on a particular node of distributed database system 202, and/or cost of data transfer among nodes of distributed database system 202. For example, due to the relatively low computational cost of encoding a column having a very small number of distinct values, it may be more efficient for external data source 200 to encode the column than for distributed database system 202 to encode the column.

At any time relative to loading unencoded database data into distributed database system 202, external data source 200 may update its system-level state information to indicate which columns of database data are encoded, whether a particular column is encoded at external data source 200 or at distributed database system 202, what type of encoding is used, etc. For example, external data source 200 may update a database dictionary to reflect a cost-based determination to encode columns 102-104 at distributed database system 202 using dictionary compression.

At element 204, external data source 200 sends unencoded database data to distributed database system 202. The unencoded database data may comprise chunks of relational data corresponding to one or more columns of database data to be encoded at distributed database system 202. Distributed database system 202 may respond to the "BEGIN_LOAD" request by invoking its query optimizer to generate a respective query execution plan for each column to be encoded at distributed database system 202. Furthermore, distributed database system 202 may process the incoming chunks to generate a table of unencoded database data.

Each query execution plan specifies a sequence of operations for generating a respective code dictionary. In some embodiments, a code dictionary is implemented as a database table that can be joined with a table of database data. Thus, each query execution plan may also specify a join operation for generating a respective column of encoded database data based on a code dictionary.

Different query execution plans may specify different sequences of operations for generating code dictionaries. The different sequences of operations may be based on any of a variety of factors including column characteristics, available memory on a particular node of distributed database system 202, and/or cost of data transfer among nodes of distributed database system 202. For example, column 102 has a relatively small number of distinct values, whereas column 104 has a relatively large number of distinct values; thus, the sequence of operations for generating a code dictionary for column 102 may be different from the sequence of operations for generating a code dictionary for column 104.

Although FIG. 2 depicts external data source 200 as concurrently sending unencoded database data and causing generation of a query execution plan, sending unencoded database data may be performed at any time relative to causing generation of a query execution plan. This is because the query optimizer of distributed database system 202 can be separately provided with information necessary for generating a query execution plan. For example, column characteristics may be included in parameters of the "BEGIN_LOAD" command.

After unencoded database data is loaded into distributed database system 202, the data transfer protocol may be completed with an "END_LOAD" database command. In some embodiments, external data source 200 offloads execution of the query execution plan(s) to distributed database system 202 and waits to receive, from distributed database system 202, an acknowledgement indicating that generation of encoded database data is complete.

At element 206, distributed database system 202 accepts execution of the query execution plan(s) and generates one or more code dictionaries according to the query execution plan(s). As mentioned above, different query execution plans may specify different sequences of operations for generating code dictionaries. For a column having a relatively small number of distinct values, a query execution plan may specify performing a de-duplication operation before a ranking operation, because performing the de-duplication operation early would significantly reduce the cost of performing subsequent operations. In contrast, for a column having a relatively large number of distinct values, a query execution plan may specify performing a ranking operation before performing a de-duplication operation, because there is no net benefit in performing the de-duplication operation early.

At element 208, distributed database system 202 generates one or more columns of encoded database data according to the query execution plan(s). This is achieved based on joining each column of unencoded database data with a respective code dictionary. In some embodiments, each code dictionary is concurrently joined with a table of unencoded database data.

At optional element 210, distributed database system 202 sends, to external data source 200, an acknowledgement indicating that generation of encoded database data is complete. After receiving the acknowledgement, external data source 200 may update its system-level state information with table state, statistics, etc. For example, external data source 200 may update a database dictionary such that each code dictionary is defined by the database dictionary.

Dictionary Generation

Figure 3:
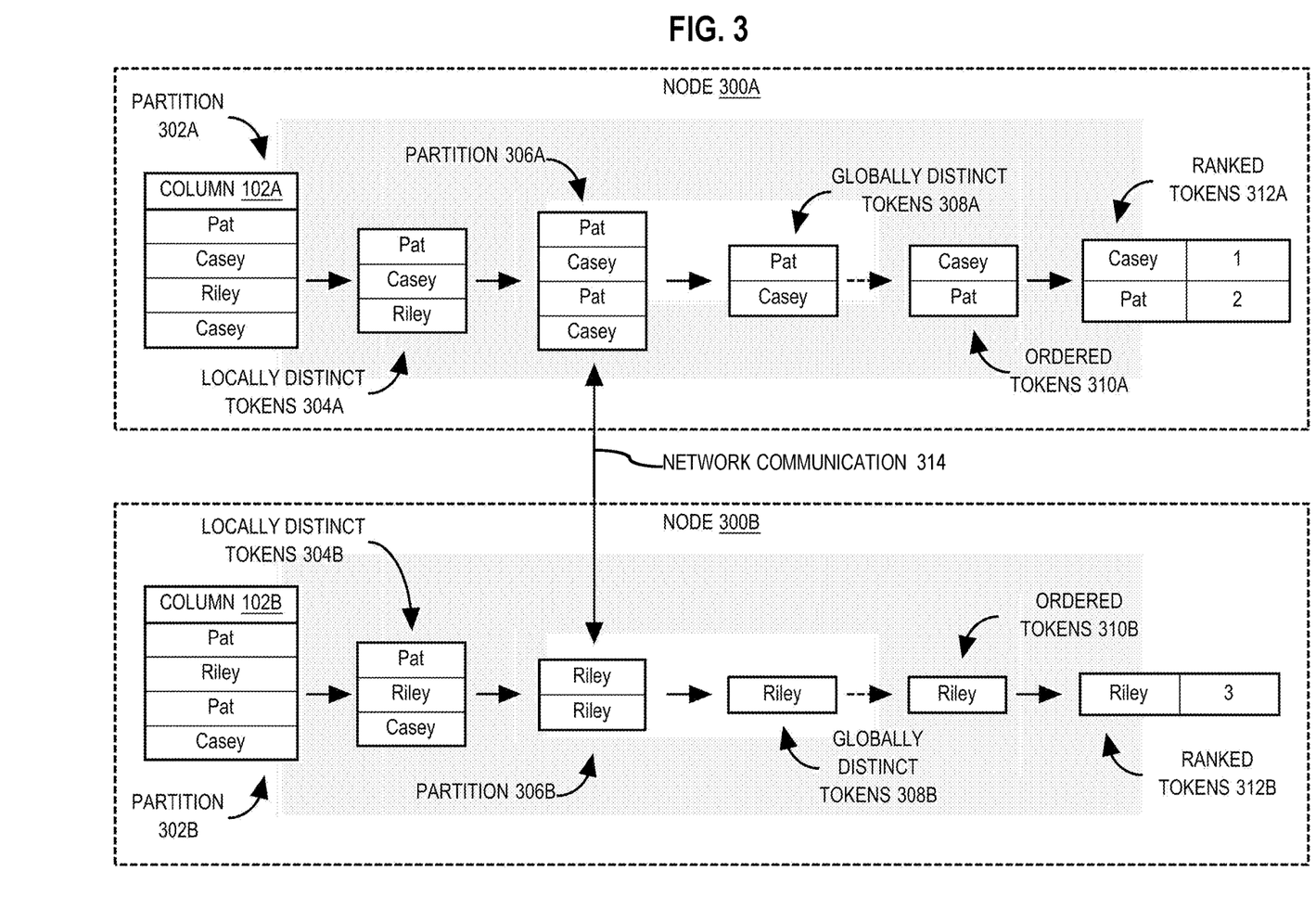
FIGS. 3-4 depict example approaches for generating a relational dictionary.
Figure 4:
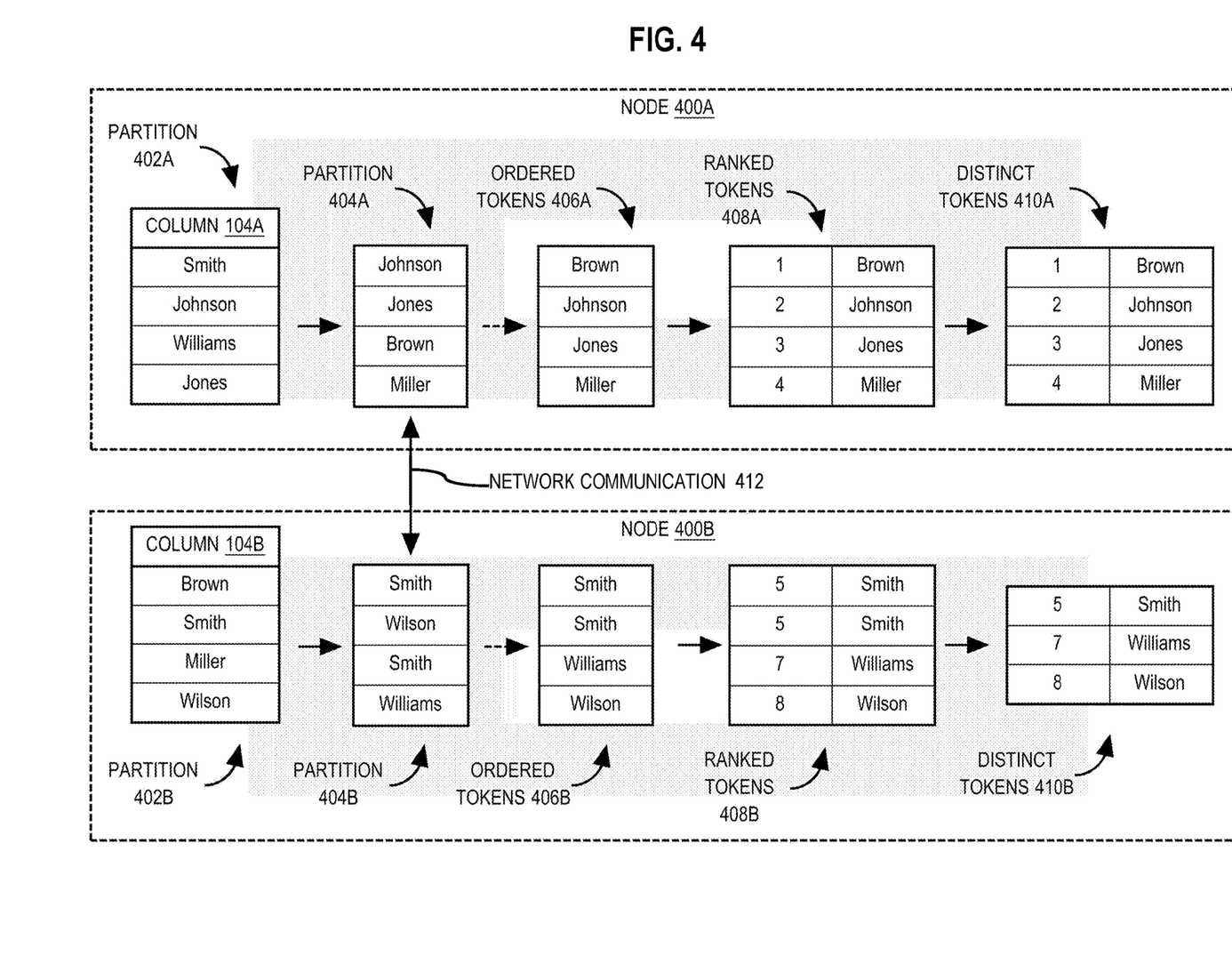

As mentioned above, different query execution plans may specify different sequences of operations for generating code dictionaries in a distributed environment. FIGS. 3-4 depict different sequences of operations performed in a multi-node environment. Although FIGS. 3-4 each depict only two nodes for the sake of clarity and ease of explanation, it should be appreciated that each sequence of operations can be performed using any number of nodes. In some embodiments, nodes 300A-B of FIG. 3 refer to the same nodes as nodes 400A-B of FIG. 4.

FIG. 3 depicts an example approach for generating code dictionary 112 in a distributed manner. As mentioned above, code dictionary 112 is associated with column 102, which has a relatively small number of distinct values. Accordingly, a query execution plan may specify a sequence of operations in which a de-duplication operation is performed before a ranking operation.

Referring to FIG. 3, upon being loaded, the unencoded database data of column 102 is partitioned across nodes 300A-B. Partition 302A comprises the first four values of column 102, and partition 302B comprises the next four values of column 102. Partition 302A is distributed to node 300A, and partition 302B is distributed to node 300B.

In some embodiments, unencoded database data is further partitioned across multiple cores of each node. Although each node can have any number of cores, assume for the sake of illustration that node 300A comprises two cores—Core A and Core B. The four values of column 102A may be partitioned across the cores such that two values are distributed to each of the cores.

In some embodiments, "local" range partitioning is used to distribute unencoded database data across multiple cores of a node. As used herein, a "local" operation is performed within a single node, whereas a "global" operation is performed across multiple nodes. Range partitioning involves dividing database data into partitions according to an upper boundary and/or a lower boundary for each partition. For example, values between "A" and "M" may be distributed to Core A, and values between "N" and "Z" may be distributed to Core B. Thus, two instances of "Casey" may be distributed to Core A; and "Pat" and "Riley" may be distributed to Core B.

A local de-duplication operation is then performed within each of nodes 300A-B to generate locally distinct tokens 304A-B. In some embodiments, a local de-duplication operation is performed within each core of a node. Continuing with the preceding example, Core A may perform a local de-duplication operation to reduce the two instances of "Casey" into one.

Thereafter, a global range partitioning is used to distribute locally de-duplicated values across multiple nodes. Referring to FIG. 3, values starting with a letter between "A" and "P", inclusive, are distributed to node 300A, and values starting with a letter between "R" and "Z", inclusive, are distributed to node 300B. Thus, partition 306A comprises two instances each of "Pat" and "Casey", whereas partition 306B comprises two instances of "Riley". The query optimizer of the distributed database system can partition the values such that they are distributed across the nodes in a roughly even manner, because the query optimizer has access to such information as the total number of nodes, column characteristics, etc.

Advantageously, performing local de-duplication operations significantly reduces the amount of data transmitted between/among the nodes during the subsequent global range partitioning. In other words, network communication 314 is significantly reduced based on performing de-duplication early in the sequence of operations.

In some embodiments, local range partitioning is again used to distribute unencoded database data across multiple cores of a node. This time, however, the unencoded database data is the result of the global range partitioning—partitions 306A-B. For example, partition 306A may be distributed across Cores A-B such that the two instances of "Casey" are distributed to Core A and the two instances of "Pat" are distributed to Core B.

Thereafter, a local de-duplication operation is again performed within each of nodes 300A-B. This time, however, globally distinct tokens 308A-B are generated. Continuing with the preceding example, Core A may perform a local de-duplication operation to reduce the two instances of "Casey" into one, and Core B may perform a local de-duplication operation to reduce the two instances of "Pat" into one.

An optional local sort operation may then be performed within each of nodes 300A-B to generate ordered tokens 310A-B. Performing the local sort operation enables generation of a global dictionary that is token-ordered. In some embodiments, the optional local sort operation is performed at least in part during local range partitioning. In the examples provided herein, tokens are sorted in a lexicographical order, but the particular sort order used may vary from implementation to implementation.

Thereafter, a ranking operation is performed within each of nodes 300A-B to generate ranked tokens 312A-B, which are essentially partitions of a global dictionary. In other words, the ranking operations effectively assign a respective code to each token. Notably, each node stores a different partition of the global dictionary.

Depending on the manner in which the ranking operations are performed, the resulting global dictionary codes may be "sparse" or "dense". As used herein, sparse codes have gaps between codes, whereas dense codes are consecutive. For example, the set of codes comprising "1", "2", and "4" are sparse, because the set does not include the code "3".

Sparse codes may be generated if, based on column characteristics, the query optimizer of the distributed database system roughly allocates a range of codes to each node. For example, codes 1-3 may be allocated to node 300A, and codes 4-6 may be allocated to node 300B. Notably, the codes "3", "5", and "6" would not be assigned to any token. In other words, the query optimizer errs on the side of over-allocation.

Dense codes may be generated based on communicating the number of distinct values in a node. For example, node 300A may communicate to node 300B that there are only two distinct values in node 300A. As a result, node 300B may begin ranking with the code "3".

FIG. 4 depicts an example approach for generating code dictionary 118 in a distributed manner. As mentioned above, code dictionary 118 is associated with column 104, which has a relatively large number of distinct values. Accordingly, a query execution plan may specify a sequence of operations in which a ranking operation is performed before a de-duplication operation.

Referring to FIG. 4, upon being loaded, the unencoded database data of column 104 is partitioned across nodes 400A-B. Partition 402A comprises the first four values of column 104, and partition 402B comprises the next four values of column 104. Partition 402A is distributed to node 400A, and partition 402B is distributed to node 400B.

Notably, there is no net benefit in performing de-duplication operations early on the values of column 104. In other words, performing de-duplication operations early would achieve little, if any, reduction in the amount of network communication 412. Thus, the reduction would not offset the cost of performing de-duplication twice for each node.

Accordingly, a global range partitioning is used instead to redistribute the unencoded database data across the nodes. Referring to FIG. 4, partition 404A comprising values starting with a letter between "A" and "M", inclusive, are distributed to node 400A; and partition 404B comprising values starting with a letter between "N" and "Z", inclusive, are distributed to node 400B.

In some embodiments, local range partitioning is used to further distribute unencoded database data across multiple cores of a node. Although each node can have any number of cores, assume for the sake of illustration that node 400B comprises two cores—Core A and Core B. The values of partition 404B may be distributed across the cores of node 400B such that values between "N" and "T" are distributed to Core A, and values between "U" and "Z" are distributed to Core B. Thus, two instances of "Smith" may be distributed to Core A; and "Williams" and "Wilson" may be distributed to Core B. Thereafter, each core can perform sorting, ranking, and/or de-duplication operations on its own set of values.

An optional local sort operation may then be performed within each of nodes 400A-B to generate ordered tokens 406A-B. As mentioned above, performing the local sort operation enables generation of a global dictionary that is token-ordered. In some embodiments, the optional local sort operation is performed at least in part during local range partitioning.

Thereafter, a ranking operation is performed within each of nodes 400A-B to generate ranked tokens 408A-B. As mentioned above, the ranking operations effectively assign a respective code to each token. However, the resulting global dictionary codes may be sparse or dense. This may depend on the manner in which the ranking operations are performed. Additionally or alternatively, this may depend on the types of ranking operations used.

A typical ranking operation generates sparse codes because of the way in which duplicate values are handled. In the example of FIG. 4, ranked tokens 408B include two instances of "Smith". Each instance is assigned the code "5" as if they were tied for fifth place. However, since there are six values ranked ahead of "Williams", this value is assigned the code "7", thereby creating a gap in the sequence of codes.

In contrast, a dense ranking operation generates dense codes. This is achieved by avoiding the creation of a code gap after duplicate values. Thus, in the preceding example, a dense ranking operation would assign the code "6" to "Williams" regardless of the number of values ranked ahead of "Williams".

A local de-duplication operation is then performed within each of nodes 400A-B to generate distinct tokens 410A-B, which are essentially partitions of a global dictionary. Notably, each node stores a different partition of the global dictionary, and each partition stores globally distinct values. Significantly, FIG. 4 depicts half as many de-duplication operations as FIG. 3.

Dictionary Encoding

Encoded database data can also be efficiently generated in a distributed manner. At a high level, dictionary encoding in a distributed environment involves co-locating a partition of unencoded database data and an associated dictionary partition on the same node such that each node can independently generate a partition of encoded database data. As mentioned above, the query optimizer generates a query execution plan for each column to be encoded at the distributed database system. Thus, each query execution plan specifies the most efficient way to co-locate and join partitions of unencoded database data and their associated dictionary partitions.

Figure 5:
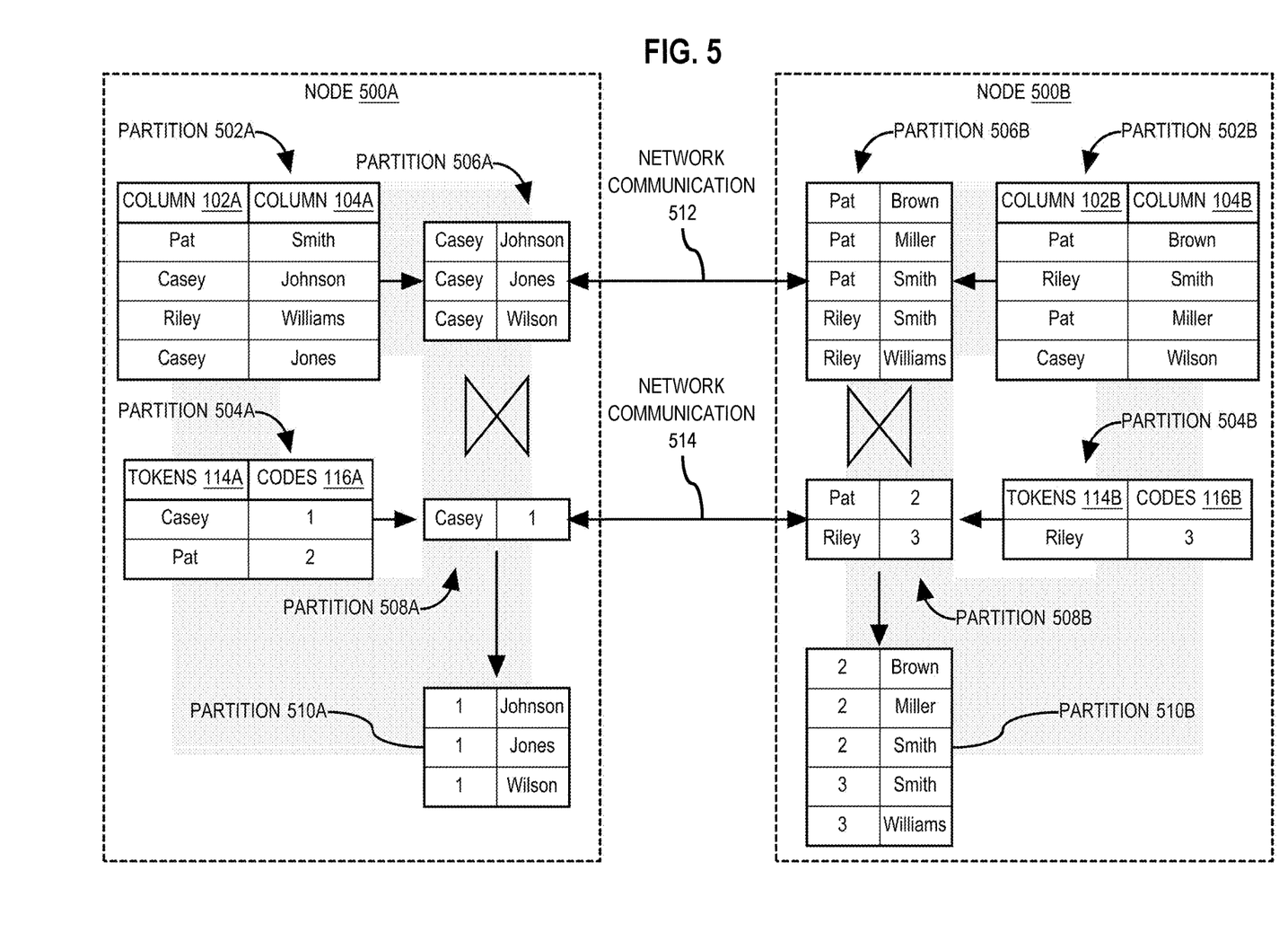
FIG. 5 depicts an example approach for generating encoded database data.

Referring to FIG. 5, nodes 500A-B generate encoded database data in a distributed manner. More specifically, nodes 500A-B generate partitions 510A-B, each of which comprise encoded values for column 102. Although only two nodes are depicted for the sake of clarity and ease of explanation, it should be appreciated that any number of nodes may be used. In some embodiments, nodes 500A-B refer to the same nodes as nodes 300A-B.

Partitions 502A-B are loaded into nodes 500A-B. In the example of FIG. 5, partition 502A comprises the first four rows of unencoded table 100, and partition 502B comprises the next four rows of unencoded table 100. At a minimum, partitions 502A-B include the values of the columns to be encoded at the distributed database system. In the example of FIG. 5, these are the values of columns 102A-B and 104A-B.

Using the approach depicted in FIG. 3, nodes 500A-B generate partitions 504A-B of a global dictionary for column 102. Notably, a partition of unencoded database data and its associated dictionary partition are not necessarily co-located on the same node. For example, partition 504A comprises codes 116A for tokens 114A "Casey" and "Pat", but not "Riley"; however, column 102A comprises "Riley" in addition to "Casey" and "Pat".

Thus, global range partitioning may be used to co-locate a partition of unencoded database data and its associated dictionary partition on the same node. Referring to FIG. 5, partitions 506A-B of unencoded table 100 and partitions 508A-B of a global dictionary are generated based on network communications 512-514. For example, values of column 102 between "A" and "M" may be distributed to node 500A, and values of column 102 between "N" and "Z" may be distributed to node 500B.

For columns having a relatively large number of distinct values, a partition of unencoded database data and its associated dictionary partition may be co-located on the same node during dictionary generation. Referring back to FIG. 4, for the sake of illustration, distinct tokens 410A-B are dictionary partitions that can encode partitions 404A-B. Notably, it is unnecessary to perform a global range partition on the dictionary, because each partition of unencoded database data is already co-located on the same node with its associated dictionary partition.

In some embodiments, local range partitioning is used to further distribute unencoded database data and global dictionary data across multiple cores of a node. Although each node can have any number of cores, assume for the sake of illustration that node 500B comprises two cores—Core A and Core B. The rows of partitions 506B and 508B may be distributed across the cores of node 500B such that rows storing "Pat" are distributed to Core A, and rows storing "Riley" are distributed to Core B. Thus, Core A may encode the rows storing "Pat", and Core B may encode the rows storing "Riley".

As mentioned above, a relational dictionary can be used to encode database data based on a join operation. Any of a variety of join operations may be used. For example, a hash join operation may be used to encode database data in partition 506B using partition 508B. A hash join operation involves a build phase and a probe phase. During the build phase, a hash table is generated on the join key of one of one of the tables to be joined. Typically, the build phase is performed on the smaller of the tables to be joined. During the probe phase, the other table is scanned, and the hash table is probed for matches.

Referring to FIG. 5, the build phase may be performed on the dictionary partitions 508A-B, and the probe phase may be performed on partitions 506A-B. The tokens of dictionary partitions 508A-B may be hashed and stored in a hash table. Thereafter, partitions 506A-B may be scanned for matching tokens. For each row of partitions 506A-B that contains a match, a token may be replaced with a corresponding code to generate partitions 510A-B, which comprise encoded database data.

For the sake of clarity and ease of explanation, FIG. 5 depicts the values of column 102 being encoded separately from the values of column 104. However, nodes 500A-B may concurrently encode columns 102-104. For example, each node may have a set of one or more cores for encoding column 102 and a different set of one or more cores for encoding column 104.

Encoded values from different columns may be stitched together into the same row of encoded table 106 based on source location information for each value. For example, a row identifier may be maintained for each token.

Dictionary Decoding

As mentioned above, external data source 200 may maintain system-level state information comprising metadata for distributed database system 202. In particular, external data source 200 may maintain information indicating which columns of unencoded table 100 are encoded on distributed database system 202.

Accordingly, when a query is processed, external data source 200 may refer to the system-level state information to determine whether or not the query involves a column that is encoded on distributed database system 202. If so, at least part of the query may be passed to distributed database system 202 at query time.

The query optimizer of distributed database system 202 generates a query execution plan for generating decoded database data. In some embodiments, the query execution plan includes a join operation between encoded table 106 and a global dictionary.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
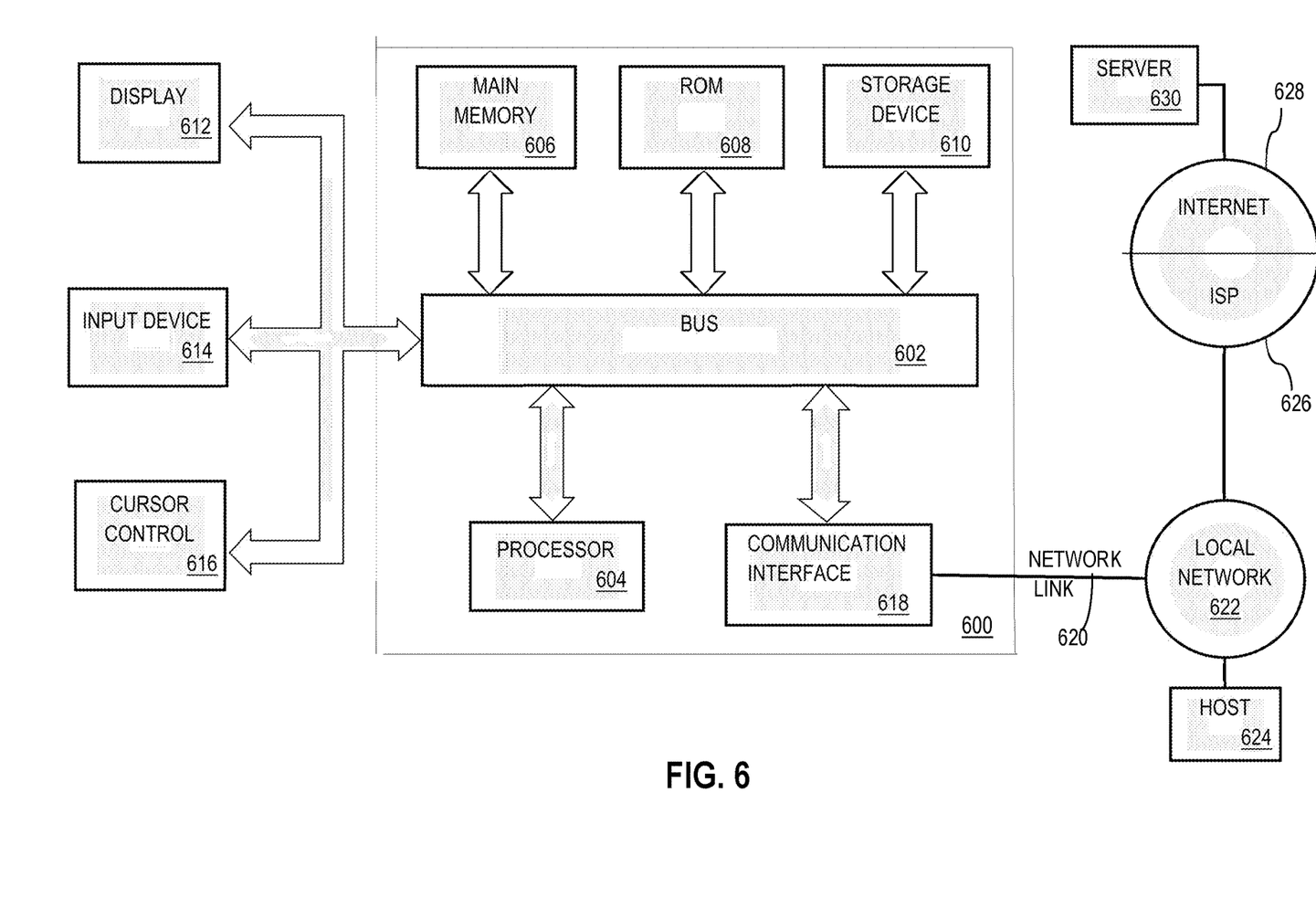
FIG. 6 depicts a computer system upon which embodiments may be implemented.

For example, FIG. 6 is a block diagram that illustrates a computer system 600 upon which an embodiment of the disclosure may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
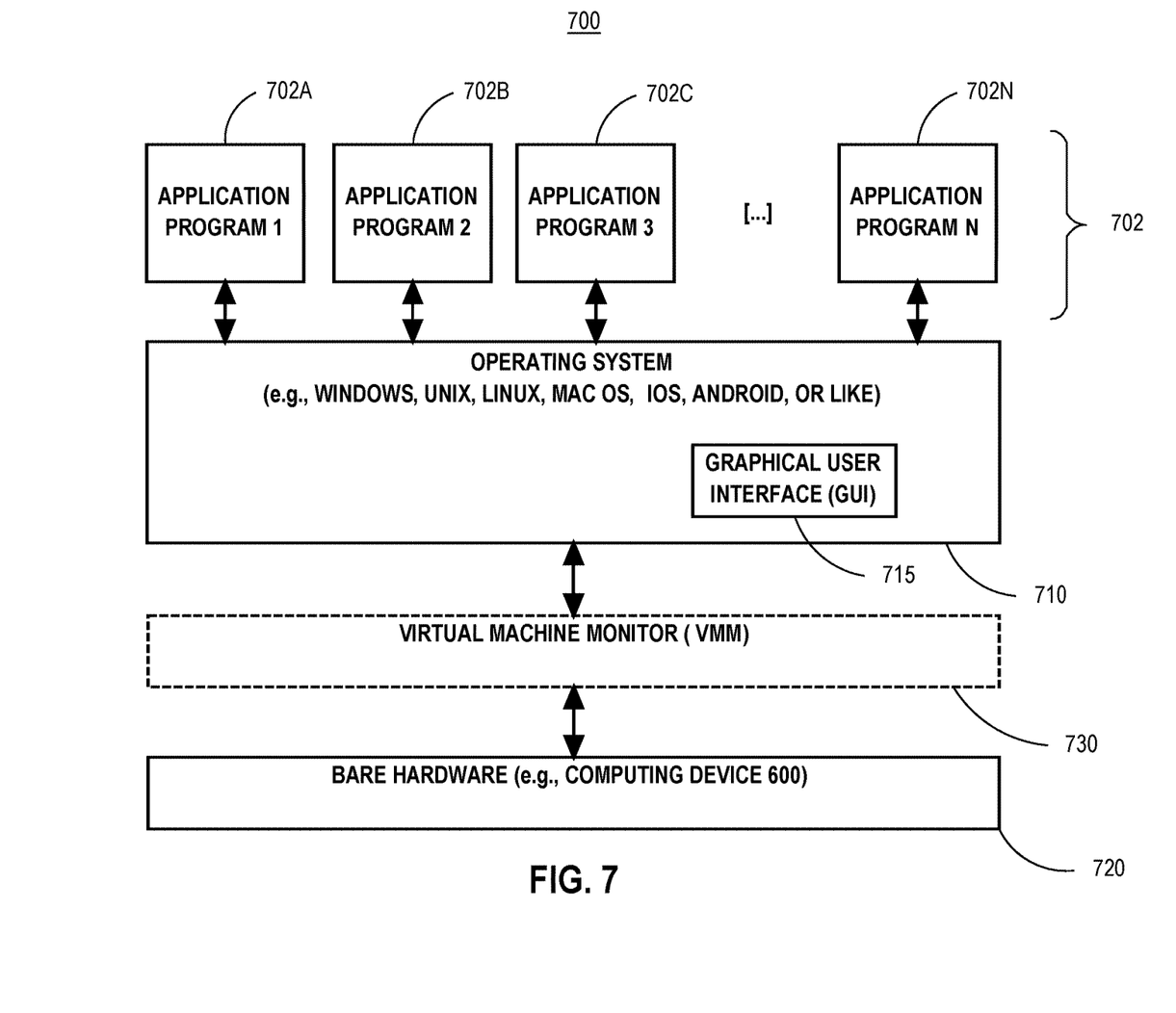
FIG. 7 depicts a software system for controlling the operation of the computer system.

FIG. 7 is a block diagram of a software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 600. The applications or other software intended for use on system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of system 700. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   generating, by a query optimizer at a distributed database system, a first query execution plan for generating a first code dictionary and a first column of encoded database data, said first query execution plan specifying a first sequence of operations for generating said first code dictionary, said first code dictionary being a database table;
   receiving, at said distributed database system, a first column of unencoded database data from a data source external to said distributed database system;
   generating, at said distributed database system, said first code dictionary according to said first query execution plan;
   based on joining said first column of unencoded database data with said first code dictionary, generating, at said distributed database system, said first column of encoded database data according to said first query execution plan; and
   wherein the method is performed by one or more computing devices.

2. The method of claim 1, wherein said data source external to said distributed database system is a centralized database system.

3. The method of claim 1, further comprising sending, to said data source external to said distributed database system, an indication that said first column of encoded database data has been generated according to said first query execution plan.

4. The method of claim 1, further comprising, after generating said first column of encoded database data according to said first query execution plan, causing said first code dictionary to be defined by a database dictionary of said data source external to said distributed database system.

5. The method of claim 1, further comprising, prior to generating said first query execution plan, making a cost-based decision to generate said first column of encoded database data at said distributed database system instead of at said data source external to said distributed database system.

6. The method of claim 5, wherein said cost-based decision is based on at least one of a group comprising column characteristics, available memory on a particular node of said distributed database system, and cost of data transfer among nodes of said distributed database system.

7. The method of claim 1, wherein said first sequence of operations comprises performing a de-duplication operation before performing a ranking operation.

8. The method of claim 1, wherein said first sequence of operations comprises performing a ranking operation before performing a de-duplication operation.

9. The method of claim 1, wherein said first sequence of operations comprises a partitioning operation for distributing unencoded database data across multiple cores of a node of said distributed database system.

10. The method of claim 1, further comprising generating, by said query optimizer at said distributed database system, a second query execution plan for generating a second code dictionary and a second column of encoded database data, said second query execution plan specifying a second sequence of operations for generating said second code dictionary, said second sequence of operations being different from said first sequence of operations, said second code dictionary being a database table.

11. One or more non-transitory storage media storing a sequence of instructions which, when executed by one or more computing devices, cause:
   generating, by a query optimizer at a distributed database system, a first query execution plan for generating a first code dictionary and a first column of encoded database data, said first query execution plan specifying a first sequence of operations for generating said first code dictionary, said first code dictionary being a database table;
   receiving, at said distributed database system, a first column of unencoded database data from a data source external to said distributed database system;
   generating, at said distributed database system, said first code dictionary according to said first query execution plan; and
   based on joining said first column of unencoded database data with said first code dictionary, generating, at said distributed database system, said first column of encoded database data according to said first query execution plan.

12. The one or more non-transitory storage media of claim 11, wherein said data source external to said distributed database system is a centralized database system.

13. The one or more non-transitory storage media of claim 11, wherein said sequence of instructions further comprise instructions, which when executed by said one or more computing devices, cause sending, to said data source external to said distributed database system, an indication that said first column of encoded database data has been generated according to said first query execution plan.

14. The one or more non-transitory storage media of claim 11, wherein said sequence of instructions further comprise instructions, which when executed by said one or more computing devices, cause, after generating said first column of encoded database data according to said first query execution plan, causing said first code dictionary to be defined by a database dictionary of said data source external to said distributed database system.

15. The one or more non-transitory storage media of claim 11, wherein said sequence of instructions further comprise instructions, which when executed by said one or more computing devices, cause, prior to generating said first query execution plan, making a cost-based decision to generate said first column of encoded database data at said distributed database system instead of at said data source external to said distributed database system.

16. The one or more non-transitory storage media of claim 15, wherein said cost-based decision is based on at least one of a group comprising column characteristics, available memory on a particular node of said distributed database system, and cost of data transfer among nodes of said distributed database system.

17. The one or more non-transitory storage media of claim 11, wherein said first sequence of operations comprises performing a de-duplication operation before performing a ranking operation.

18. The one or more non-transitory storage media of claim 11, wherein said first sequence of operations comprises performing a ranking operation before performing a de-duplication operation.

19. The one or more non-transitory storage media of claim 11, wherein said first sequence of operations comprises a partitioning operation for distributing unencoded database data across multiple cores of a node of said distributed database system.

20. The one or more non-transitory storage media of claim 11, wherein said sequence of instructions further comprise instructions which, when executed by said one or more computing devices, cause generating, by said query optimizer at said distributed database system, a second query execution plan for generating a second code dictionary and a second column of encoded database data, said second query execution plan specifying a second sequence of operations for generating said second code dictionary, said second sequence of operations being different from said first sequence of operations, said second code dictionary being a database table.

* * * * *